June 18, 1935.　　A. S. BEHRMAN　　2,004,973
POROUS SEPARATOR
Filed Dec. 13, 1930
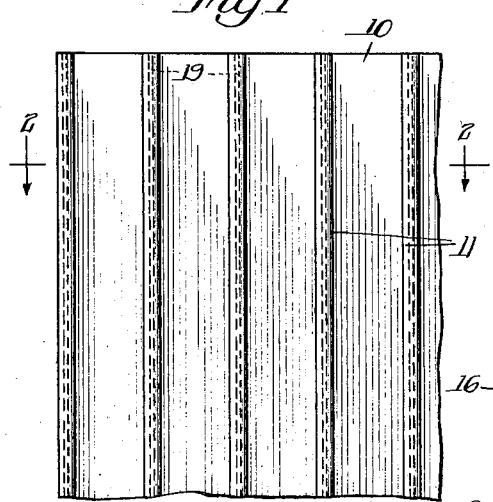
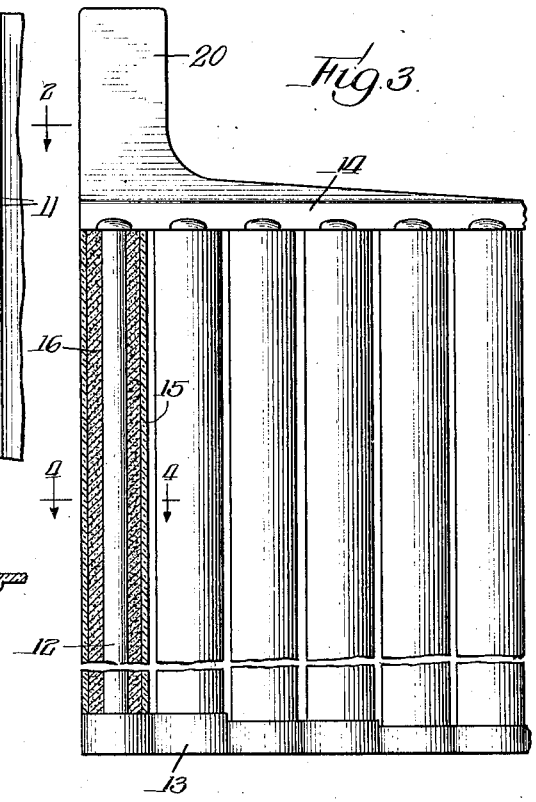
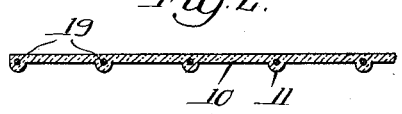
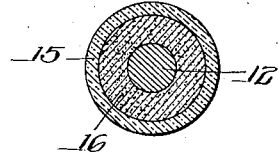
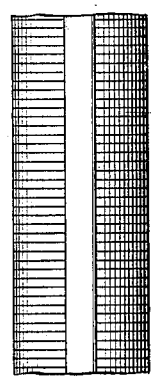
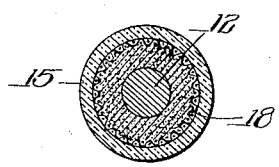
Inventor:-
A. S. Behrman
By Cromwell, Greist Warden
Attys.

Patented June 18, 1935

2,004,973

UNITED STATES PATENT OFFICE 2,004,973

POROUS SEPARATOR

Abraham Sidney Behrman, Chicago, Ill., assignor to A. S. Behrman, trustee of Porous Rubber Products Trust, Chicago, Ill.

Application December 13, 1930, Serial No. 502,118

8 Claims. (Cl. 136—146)

This application is a continuation in part of my co-pending application, Serial No. 339,269, filed February 11, 1929, now issued as Patent No. 1,784,981, granted December 16, 1930 and reissued September 29, 1931 as Reissue Patent No. 18,214.

The invention relates to porous separators such as are used in electric storage batteries, electrolytic cells and similar devices.

Among the objects of the invention is the provision of a novel porous separator of hard rubber having great rigidity and mechanical strength, high chemical resistivity, low electrical resistance in electrolytes, and that is simple and cheap to manufacture.

The foregoing and other objects of the invention will be best understood from the following explanation and description of exemplifications thereof, reference being had to the accompanying drawing, wherein Fig. 1 is an elevation of a portion of a separator plate embodying the invention;

Fig. 2 is an edge view of the plate in Fig. 1;

Fig. 3 is an elevation, with parts in the section, of a battery plate of a storage battery embodying the invention;

Fig. 4 is a transverse section through one of the elements of the battery shown in Fig. 3;

Fig. 5 is a view similar to Fig. 4 of a modification of the invention; and

Fig. 6 is an elevation of a portion of an element of a battery like that in Fig. 3, illustrating a further modification of the invention.

In the construction of efficient storage batteries the separator plates which prevent the active electric material from flowing to the electrodes of opposite polarity while permitting flow of ions and electrolytic action constitute one of the most vital elements. The most important requirements for a satisfactory separator are as follows: (1) closeness of texture to prevent penetration of conducting deposits tending to form short circuits; (2) sufficient permeability to permit diffusion of the electrolyte or of the ions therein to secure low electrical resistance; (3) resistance to chemical action of the electrolyte; and (4) mechanical strength to resist cracking or disintegration from shock or other strains to which the battery elements are normally exposed.

A great variety of materials and compositions have been suggested, and to a certain extent used as separators in storage batteries, but wooden separators are chiefly used at the present, principally because of their low electrical resistance and cheapness. The average life of wooden separators is, however, relatively short, about one to two years only, and the deterioration of these wooden separators is the chief cause for the present short life of storage batteries.

I have found that porous separators much superior to wood and meeting the foregoing requirements to a higher degree than other separators now available may be made cheaply out of hard rubber. The term "hard rubber" as used herein and in the claims appended hereto is intended to signify materials such as vulcanite or ebonite made by over-vulcanizing rubber so that the resulting material is hard, tough and horn-like.

As far as I am aware it has heretofore been impossible to make economically separator plates of hard rubber that would have sufficient continuous porosity to give the separator plates an electrolytic conductivity comparable to that of wooden separators.

According to my invention hard-rubber porous separator plates or devices are made of pulverized or comminuted hard rubber particles by heating to a high temperature at which the particles liquefy and become sticky, and then suitably moulding the heated mass with or without a porous filler so that the more or less liquefied hard rubber particles merge and become bonded together, and on cooling constitute a hard rigid member that is mechanically and chemically similar to hard rubber of original manufacture, but which has in addition a high degree of porosity.

I have found that hard rubber as now commonly employed in the arts may be heated to the melting point or even higher and that it will on cooling retain great mechanical strength and chemical resistivity, particularly if the melting process and handling of the material at high temperatures are conducted in the absence of oxygen. When such hard rubber is heated to about 300° C. the rubber melts and becomes quite sticky and fairly fluid. On cooling, as for instance, by placing it in cold water, the rubber quickly hardens and shows all the characteristics of original hard rubber. Comminuted or pulverized hard rubber particles, obtained for instance by grinding waste hard rubber scrap, become, on heating, more or less liquefied, adhesive and sticky, and may be readily united into an integral mass by moulding under pressure. A filler material may be added to the pulverized hard rubber, the hard rubber serving as a binder. On cooling, the material shows the characteristics of original hard rubber but is in addition highly porous, particularly if the filler material added to it is porous.

The invention may be carried out in a variety of different forms and I shall described hereinafter several examples thereof.

In the form of invention where the porous separators are made only of hard rubber without an additional porous filler, a suitable amount of powdered, granulated or otherwise comminuted hard rubber is placed in a mould and heated, preferably in the absence of oxygen, to a temperature of about 325° C. The material is maintained at this temperature for a short while, for instance, five minutes and then suitably pressed into its form. The temperature to which the material is heated and the time during which it is maintained at a high temperature will vary, depending on the mass of the material used and the character of the material. The porosity of the moulded mass will depend on the size of the particles, on the degree of pressure applied and the extent to which the particles have been liquefied. If the particles are relatively large and are only partially liquefied when moulded the resulting body will be highly porous. Where the particles are small and where they are heated so as to more or less completely liquefy the moulded mass will be of lesser porosity, the latter depending of course also on the pressure applied during moulding. The pressure is preferably maintained during the cooling operation until the moulded rubber is cooled below the plastic point.

In making separator plates for storage batteries I use moulds having cavities arranged to shape the moulded body into plates 10 such as shown in Figs. 1 and 2, with reinforcing ridges 11, which also serve as spacers between the storage battery plates. The plates so obtained are rigid, stiff and porous. They have a much higher chemical resistivity than wooden separators, and have an electrical resistivity that is much more favorable than that of other wood substitutes available at the present time. Hard rubber spacers are much superior to spacers of soft rubber because of the greater resistance of hard rubber to the oxidation conditions at the positive storage battery plates, which are usually made of lead peroxide. Soft rubber, while better than wood, is to a certain extent affected by the oxidation conditions and will after a time deteriorate.

In the preferred form of the invention I use a composition made of moulded hard rubber particles and a porous inert filler material such as silica gel. The use of such composite material has several advantages. If particles of comminuted hard rubber are used alone it is somewhat difficult to produce a moulded product which is uniformly porous. Again if the product is to be used as a filter plate or as a separator plate, it is frequently desirable to have a solid surface or plate without observable cavities, relying primarily on the inherent porosity of the silica gel for the electrical conductivity, so as to avoid actual voids and channels in the hard rubber, since such channels may become more or less readily clogged with fine material.

In making such composite porous spacers I take equal weights of silica gel granules and of comminuted hard rubber. The size of the particles selected depends on the character of the final product desired. If a product of medium coarse texture is wanted I may take particles of silica gel and hard rubber which will pass a 40 mesh screen and be retained on a 50 mesh screen. If a closer structure is desired, I have successfully used the silica gel and rubber particles finer than 100 mesh. It is advantageous to mix the mass of silica gel and rubber particles with some liquid which will wet both substances so as to form a plastic mouldable mass. Ordinary denatured alcohol has been found satisfactory for this purpose but many other liquids may be employed instead. When using alcohol care must be taken to avoid fire during the processing of the spacers.

The wet mass having somewhat a consistency of stiff mud is placed in a mould, as for instance, a plate like that shown in Figs. 1 and 2, and pressed sufficiently to remove excess liquid and to distribute the mass evenly in the mould. The remaining liquid is then evaporated at a reasonably low temperature, particularly, where alcohol is used, to avoid the danger of fire and the subsequent heat. The mould is thereupon heated until the rubber particles more or less liquefy, and become adhesive and plastic.

In making moulded plates 10 like those shown in Fig. 1, I have maintained the mass at a temperature of about 320° C. for about twenty minutes, the mould being placed in a suitably heated furnace. In order to prevent oxidation of the heated rubber particles or their deterioration, precautions should be taken to keep oxygen away from the rubber particles when they are heated. To this end the furnace in which the particles are heated may be filled with an inert gas such as carbon dioxide or nitrogen. It is of advantage also to use as a wetting material, or in addition to it, a substance which on volatilization or decomposition by heat will produce an inert and non-oxidizing atmosphere around the rubber particles. Ammonium nitrite or similar material may be used for this purpose.

When the rubber mass has become hot and plastic, the mould is removed from the heating chamber and quickly compressed. The mould is held under pressure until the temperature has fallen below the point of plasticity of the rubber. The mould is then cooled, preferably slowly, so as to avoid introduction of strains through too rapid changes of temperature.

The composite product made according to the foregoing process has a good deal of the appearance of hard rubber. It is strong mechanically, having considerable rigidity combined with sufficient flexibility, necessary for practical separators. The material has the required porosity; and a liquid placed on top of a moulded plate such as shown in Fig. 1 will very shortly penetrate the material and appear on the lower surface. The electrical resistance of such material is quite low, comparing favorably per unit of thickness with the resistance of wood separators and being materially less than the resistance of threaded rubber in prior types of special separator materials. Chemically the material is extremely resistant and non-corrosive, since the particles of silica gel are completely inert both toward sulphuric acid and nascent oxygen; and the hard rubber is likewise highly resistant to such reagents. An acid chlorine solution was without appreciable effect on the new material even after several months; while a soft rubber plate exposed to the same solution became cracked and brittle in less than a week, as did also a wooden separator.

This smooth, solid face of separators so prepared offers an effective filtering surface which may be cleaned off readily. Ingress into the body of the porous mass is thus prevented. This is particularly advantageous in battery separators due to the well-known tendency of the active material of the positive plate to bridge through even very fine openings, thus short circuiting the cells.

Where plates of higher porosity are desired I use a still different form of invention. I have found that the porosity of the composite plates, made as explained above, may be greatly increased by removing the filler material, such as the silica gel, from the finished article by solution with an appropriate solvent. To this end, I may place the separators made of hard rubber and silica gel as aforesaid in a solution of caustic soda or any other solvent suitable for dissolving the silica gel filler. After the silica gel or filler has thus been removed from the finished plates they are considerably more elastic than before the silica gel was dissolved out. The plates are much more permeable than before, and the electrical conductivity of the plates is greatly increased. Such plates of high porosity will be found desirable in cases where there is no danger of the voids in the hard rubber skeleton being choked up by particles of foreign matter which cannot readily be removed. Where there is such danger much more satisfactory porous separators are obtained by relying on the porosity of the filler material such as silica gel and leaving it imbedded in the rubber mass.

The shape of the moulded mass is determined by the use to which it is to be put. If the material is to be used for battery separators of the common flat type, such as shown in Figs. 1 and 2, a flat or ribbed mould is employed. The improved separator material may, however, serve not only as a separator but also as an enclosing casing to hold the active material of the electrodes, such as the lead peroxide. One form of such arrangement is shown in Figs. 3 and 4 of the drawing. A positive plate for a storage battery made in the form shown in Fig. 3 comprises a grid structure made of a plurality of suitably stiffened lead rods or pencils 12 held between a lower transverse member 13 and an upper transverse member 14 that is provided with a terminal extension 20. Each of the lead pencils has placed on it, a circular shell or tube 15 made of the moulded porous composition, of hard rubber particles and silica gel, for instance, as described above. The space between the lead pencil 12 and the walls of the tube 15 is filled with active electrode material 16, such as lead oxide.

The moulded tube 15 thus holds the active material 16 at the electrode surface and prevents its wandering away, acting thus as a separator and at the same time as a casing retaining the material in place at the electrode. Since the separator tube 15 is highly porous the entire surface of the active material will participate in the operation of the battery and no special further openings are necessary in the shell 15 to admit the electrolyte to the active surface of the electrode material 16. However, if the shell is not sufficiently porous, supplemental openings may be provided in the porous shell 15 by forming therein a series of transverse slots 17 as indicated in Fig. 5.

In order to facilitate the passage of gas bubbles a relatively free space may be provided immediately adjacent the inner surface of the porous shell 15 of the plate elements. To this end I may, as shown in Fig. 6, place adjacent the inner surface of the porous separator shell 15 a thin layer of a material such as spun glass cloth 18 made of fine flexible glass filaments. The bubbles forming at the surface of the active material have thus a space to accumulate, and their escape through the top of the shell 16 is facilitated.

Where it is desired to produce porous separators having a greater strength than those obtained by the processes described above, I place in the mould a suitable screen or reinforcing webbing and mould the pulverized rubber particles with or without an additional filler around the metal screen of webbing. The reinforcing metal parts should preferably first be coated with a foundation coating of impermeable rubber so that the acid or the like should not penetrate to the metal and attack it. Extremely rigid structures of very high porosity are thus obtained. The reinforcing structure may, for instance, consist of a series of wires indicated at 19 in Fig. 2 extending lengthwise of the strips 11 in the separator plate of Fig. 1 with suitable transverse anchoring wires, if necessary.

One of the most important features of the separators of my invention is the fact that they may be made very cheaply since the process is very economical and the pulverized bonding material may be made by grinding waste or scrap hard rubber which is ordinarily without commercial value.

There are many uses to which the porous separators of this invention may be put in addition to the uses described above. They may be, for instance, employed as diaphragms in electro-osmotic purification of water and other liquids, for which purpose their resistance to chlorine make them particularly serviceable. They are also very useful in difficult types of filtration. The finely porous structure makes separators of my invention particularly well suited for aeration, as for example in the activated sludge process of sewage purification, wherein extreme fineness of division is particularly desirable.

Many modifications, alterations and applications of the processes and compositions disclosed herein will suggest themselves to those skilled in the art, for instance—the proportions of the hard rubber and the filler materials may be suitably varied; and a variety of filler materials other than silica gel may be used. The temperature used in moulding may be varied within a wide range between that of the first mobility of the rubber to those of complete fluidity. Instead of silica gel, other substances, which may or may not be removed by subsequent treatment with an appropriate solvent or other means, may be employed, for instance, alumina gel. I accordingly desire that the appended claims be given a broad interpretation commensurate with the scope of the invention within the art.

I claim:

1. The process of producing a porous separator which comprises heating comminuted hard rubber particles to a temperature sufficiently high to cause said particles to become adhesive and stick together, said temperature being maintained sufficiently low to prevent said particles from running together to form a solid mass, and moulding said particles under pressure into the desired shape, said pressure being sufficiently low to prevent said particles from being formed into a solid mass, whereby said particles are autogenously attached together in such a manner as to provide substantial voids therebetween.

2. The process of producing a separator element, which comprises mixing particles of hard rubber with an inert porous filler material, heating the mass so formed to a temperature sufficiently high to cause the rubber particles to become adhesive and stick together, said temperature being sufficiently low to prevent the rubber particles from running together to form a solid mass, and moulding said mass into the desired shape under pressure, said pressure being sufficiently low to prevent said particles from running together to form a solid mass.

3. The process of producing a separator element, which comprises mixing particles of hard rubber with an inert porous filler material, heating the mass so formed to a temperature sufficiently high to cause said rubber particles to become adhesive and stick together, said temperature being maintained sufficiently low to prevent said particles from running together to form a solid mass, moulding the heated mass into the desired shape under pressure, said pressure being sufficiently low to prevent the rubber particles from running together to form a solid mass, and subsequently subjecting said moulded mass to treatment with a solvent for said filler material which will penetrate the pores thereof, whereby said filler material is dissolved out.

4. A porous separator comprising comminuted hard rubber particles held together by an autogenous bond to form a rigid member composed of distinct rubber particles attached to each other by said autogenous bond and having substantial and continuous voids between said particles, and a porous inert filler material distributed in the voids between the distinct particles of said rubber mass.

5. A porous separator comprising comminuted hard rubber particles held together by an autogenous bond to form a rigid member composed of distinct particles of rubber held together by said autogenous bond and having substantial and continuous voids therebetween, and silica gel distributed in the rubber mass and occupying the voids between said rubber particles.

6. A composition of matter, comprising hard particles of a porous gel-like material in admixture with comminuted hard rubber particles which are bonded autogenously together to form a rigid mass.

7. A process for forming a separating element, which comprises forming a mixture of rubber and dried particles of silica gel, vulcanizing said mixture to form a stable mass, and dissolving the silica gel from said mass.

8. A container for active ingredients of the storage battery electrode comprising a single porous casing for enclosing said active material, said casing being composed of small particles of hard rubber held together by an autogenous bond and having substantially continuous pores therebetween.

ABRAHAM SIDNEY BEHRMAN.